June 2, 1936.  H. A. TAPLIN  2,042,811
NEEDLE BEARING SPRING END MOUNTING MEANS
Filed Sept. 24, 1935   2 Sheets-Sheet 1
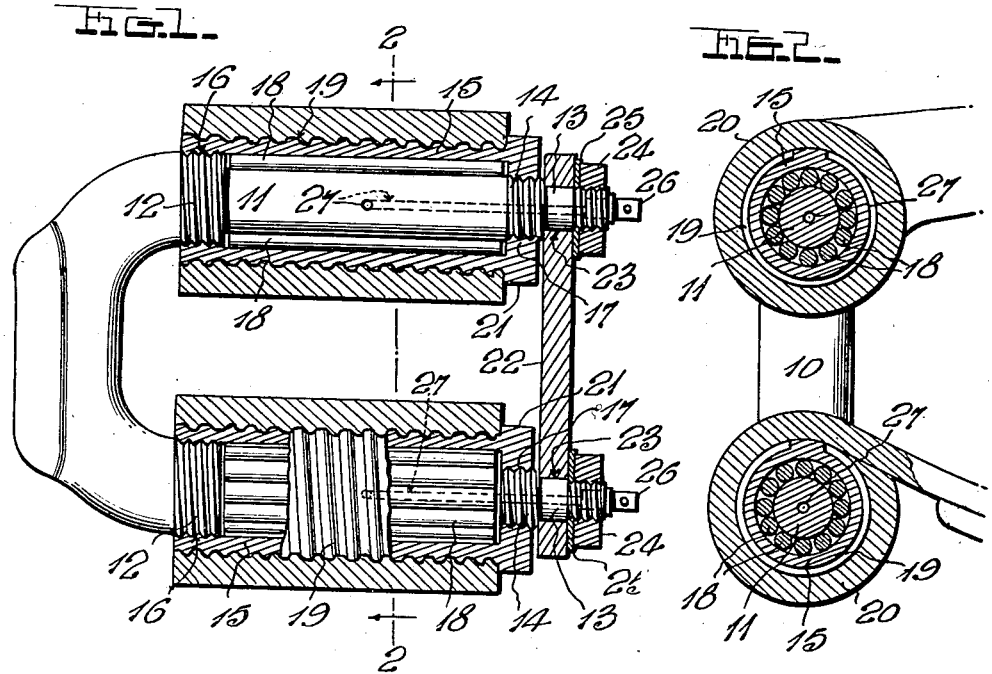
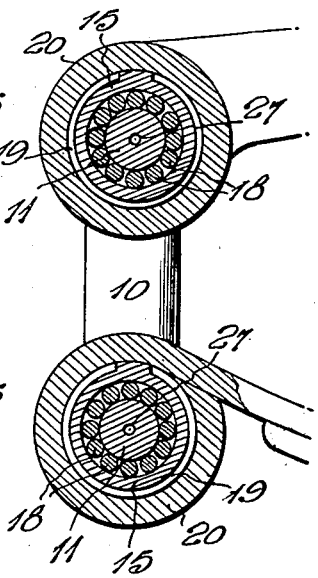
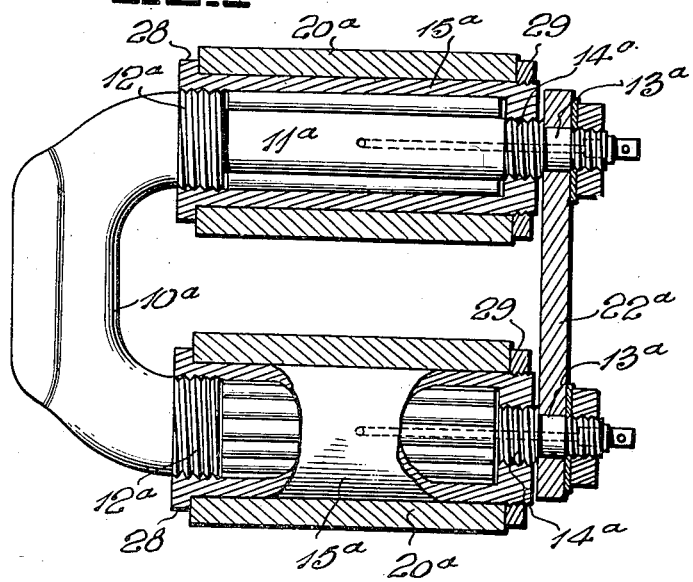
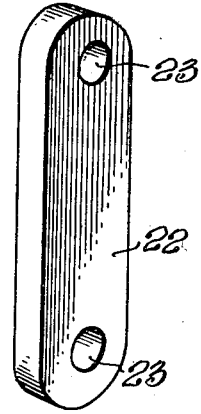
Inventor
HOWARD A. TAPLIN

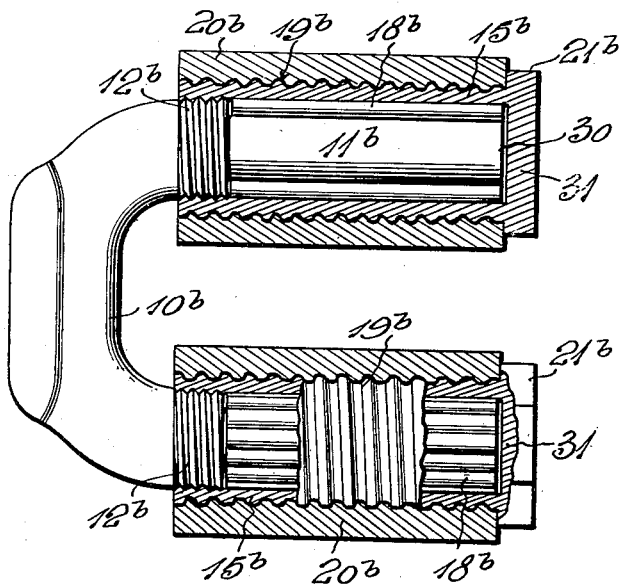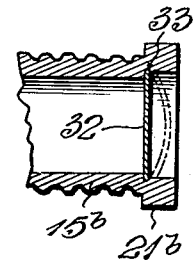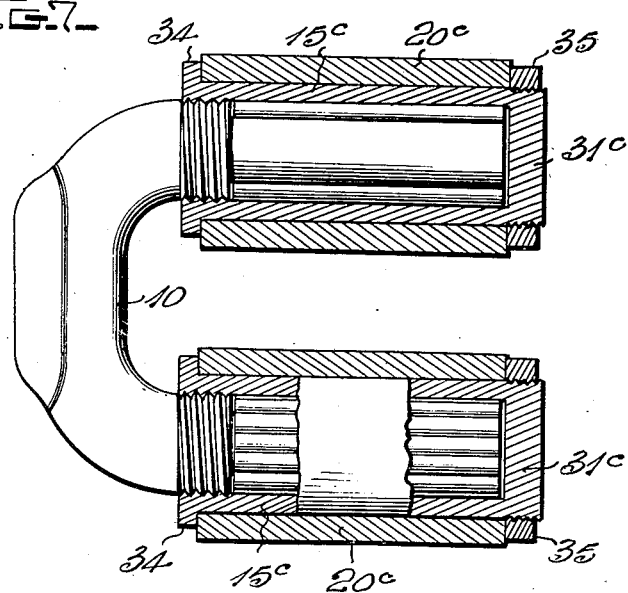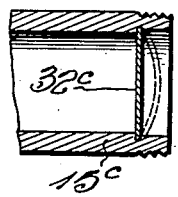

Patented June 2, 1936

2,042,811

UNITED STATES PATENT OFFICE 2,042,811

NEEDLE BEARING SPRING END MOUNTING MEANS

Howard A. Taplin, Kansas City, Mo.

Application September 24, 1935, Serial No. 41,935

8 Claims. (Cl. 267—54)

This invention, like that disclosed in my U. S. application Serial No. 26,832, filed June 15, 1935, relates to a novel pivotal mounting means for the ends of vehicle springs, and it aims to provide a new and improved construction embodying the highly advantageous needle bearings.

The principal object of the invention is to provide a construction having great strength and resistance to side thrusts, yet simple, light and inexpensive.

With the foregoing in view, the invention resides in the novel subject matter hereinafter described and claimed, description being accomplished by reference to the accompanying drawings.

Fig. 1 is a vertical sectional view partly in elevation, illustrating one form of heavy duty construction.

Fig. 2 is a sectional view on line 2—2 of Fig. 1.

Fig. 3 is a perspective view of the link which connects the pivot arms of the C-shaped shackle in Fig. 1.

Fig. 4 is a view similar to Fig. 1 but showing a different construction.

Fig. 5 is a sectional view partly in elevation showing a construction which includes no connecting link between the pivot arms of the C-shaped shackle.

Fig. 6 is a detail sectional view showing a different manner in which the outer ends of the bushings of Fig. 5 may be closed.

Fig. 7 is a view similar to Fig. 5 but illustrating a different construction.

Fig. 8 is a detail sectional view showing a different way for closing the outer ends of the bushings shown in Fig. 7.

The construction shown in Figs. 1, 2 and 3 will first be described. In these views, 10 denotes a C-shaped shackle having parallel pivot arms 11, threaded enlargements 12 at the inner ends of said pivot arms, and studs 13 projecting from the outer ends of said pivot arms, the outer end portions of said studs being externally threaded. The outer ends of the arms 11, adjacent their points of juncture with the studs 13, are provided with screw threads 14. Eye-engaging bushings 15 surround the pivot arms 11 in spaced concentric relation therewith, the inner ends of these bushing sleeves being internally threaded at 16 and engaged with the threaded enlargements 12. The outer ends of the bushing sleeves 15 are contracted at 17 and threaded upon the screw threads 14. The spaces between the bushing sleeves 15 and the pivot arms 11 are thus closed against entrance of water and grit and against escape of grease, insuring effective lubrication for the needle bearings 18 which are disposed in said spaces.

The bushing sleeves 15 are provided with coarse external screw threads 19 to be threaded into the usual eyes 20 engaged by said sleeves, and to facilitate the operation of threading the bushing sleeves into the eyes, said sleeves are preferably provided with wrench-engaging heads 21.

A connecting link 22 is provided for the pivot arms 11, said link having openings 23 receiving the unthreaded inner portions of the studs 13. Nuts 24, preferably having lock washers 25, are threaded on the outer ends of these studs to hold the link 22 in place.

Conventional lubricating nipples 26 may be provided on the outer ends of the studs 13, communicating with suitable ports 27 for conducting the lubricant to the needle bearings 18.

In Fig. 4, the shackle $10^a$ is identical with the shackle 10, its pivot arms $11^a$ being provided at their inner ends with threaded enlargements $12^a$, being threaded at their outer ends as denoted at $14^a$, and being provided with studs $13^a$ connected by a link $22^a$. The change is in the bushing sleeves $15^a$. These sleeves merely slip into their receiving eyes $20^a$, being provided at their inner ends with heads 28 abutting the inner ends of said eyes and being provided at their outer ends with nuts 29 abutting the outer ends of said eyes. The inner ends of the bushing sleeves $15^a$ are threaded upon the enlargements $12^a$ and the outer ends of said sleeves are contracted and threaded upon the portions $14^a$ of the pivot arms $11^a$.

Both of the constructions so far described are designed principally for heavy duty work and they resist side thrusts to the maximum due to threading of the bushing sleeves upon the pivot arms at both their inner and outer ends. These threaded connections also exclude foreign matter and retain grease better than a packed joint, in which the packing is subjected to constant wear.

In Fig. 5, the C-shaped shackle $10^b$ is provided with parallel pivot arms $11^b$ whose terminals 30 are within the bushing sleeves $15^b$. Threaded enlargements $12^b$ are provided at the inner ends of the pivot arms $11^b$, and the inner ends of the bushings $15^b$ are threaded upon these ends of the bushings $15^b$. The bushing sleeves and the enlargements. The bushing sleeves and the bearing arms are in spaced concentric relation and the space receives the needle bearings $18^b$. Coarse screw threads $19^b$ are provided on the bushing sleeves $15^b$ to engage the eyes $20^b$, and the outer ends of said sleeves are provided with wrench-engaging heads 21b. These outer ends of the bushings may either be closed by integral end walls 31 in opposed relation with the terminals 30 of the arms 11b, or the disk 32 shown in Fig. 6 may be employed as an end closure. The periphery of this disk is tightly seated in a groove 33 in the bushings 15b, the disk being of concavo-convex shape as shown in dotted lines when inserted. After insertion, the disk is struck with a hammer or the like, so changing its shape as to keep its edge in the groove 33.

In Fig. 7, the construction is identical with that shown in Fig. 5 except for the bushing sleeves 15c. Instead of threading these bushing sleeves into the eyes 20c, they merely slip into said eyes, being provided at one end with heads 34 and at their other ends with nuts 35 for securing them in place.

The outer ends of the bushings 15c may be closed by integral end walls 31c or by disks 32c (Fig. 8), said disks being secured in place in the same manner as explained in connection with Fig. 6.

It will be seen from the foregoing that novel and advantageous provision has been made for carrying out the objects of the invention and producing a frictionless, thorough lubricated, strong, efficient and long-lived spring end mounting means.

While the details disclosed are preferred, minor variations may be made within the scope of the invention as claimed.

I claim:—

1. A needle bearing spring end mounting means comprising a C-shaped shackle having parallel cylindrical pivot arms and cylindrical threaded enlargements at the inner ends of and concentric with said pivot arms, two eye-engaging bushing sleeves surrounding said pivot arms and having their inner ends threaded upon said enlargements, said sleeves being in spaced concentric relation with said pivot arms, needle bearings in the spaces between said sleeves and said pivot arms, closing means for the outer ends of said spaces, and means for holding said sleeves in the eyes engaged thereby.

2. In a needle bearing spring end mounting means, a cylindrical pivot arm having a concentric cylindrical threaded enlargement at its inner end, an eye-engaging bushing sleeve surrounding said pivot arm and having its inner end threaded upon said enlargement, said sleeve being in spaced concentric relation with said pivot arm, needle bearings in the space between said sleeve and said pivot arm, closing means for the outer end of said space, and means for holding said sleeve in the eye engaged thereby.

3. A needle bearing spring end mounting means comprising a C-shaped shackle having parallel cylindrical pivot arms and cylindrical enlargements at the inner ends of and concentric with said pivot arms, said enlargements being threaded, two eye-engaging bushing sleeves surrounding said pivot arms and having their inner ends threaded upon said enlargements, the outer ends of said sleeves being contracted and snugly surrounding the outer ends of said pivot arms, the major portions of said sleeves being in spaced concentric relation with said pivot arms, needle bearings in the spaces between said sleeves and pivot arms, and means for holding said sleeve in the eye engaged thereby.

4. In a needle bearing spring end mounting means, a cylindrical pivot arm having a concentric cylindrical enlargement at its inner end, said enlargement being threaded, an eye-engaging bushing sleeve surrounding said pivot arm and having its inner end threaded upon said enlargement, the outer end of said sleeve being contracted and snugly surrounding said outer end of said pivot arm, the major portion of said sleeve being spaced from said pivot arm, needle bearings in the space between said sleeve and pivot arm, and means for holding said sleeve in the eye engaged thereby.

5. A structure as specified in claim 3; said contracted outer ends of said sleeves being threaded upon said outer ends of said pivot arms.

6. A structure as specified in claim 4; said contracted outer end of said sleeve being threaded upon said outer end of said pivot arm.

7. A needle bearing spring end mounting means comprising a C-shaped shackle having parallel cylindrical pivot arms and cylindrical threaded enlargements at the inner ends of and concentric with said pivot pins, two eye-engaging bushing sleeves surrounding said pivot arms and having their inner ends threaded upon said enlargements, the outer ends of said sleeves being provided with end walls in opposed relation with the outer end faces of said pivot arms, said sleeves being in spaced concentric relation with said pivot arms, needle bearings in the spaces between said sleeves and pivot arms, and means for holding said sleeves in the eyes engaged thereby.

8. In a needle bearing spring end mounting means, a pivot arm having a cylindrical concentric enlargement at its inner end, an eye-engaging bushing sleeve surrounding said pivot arm and having its inner end threaded upon said enlargement, the outer end of said sleeve being provided with an end wall in opposed relation with the outer end face of said pivot arm, said sleeve being in spaced concentric relation with said pivot arm, needle bearings in the space between said sleeve and pivot arm, and means for holding said sleeve in the eye engaged thereby.

HOWARD A. TAPLIN.